United States Patent [19]

Hallenbeck

[11] 4,254,321

[45] Mar. 3, 1981

[54] EXPANDABLE PURGE UNIT

[76] Inventor: Emerson J. Hallenbeck, 2934 Shoreland Ave., Toledo, Ohio 43611

[21] Appl. No.: 36,178

[22] Filed: May 4, 1979

[51] Int. Cl.³ .............................................. B23K 9/16
[52] U.S. Cl. ...................................... 219/72; 219/74; 228/57
[58] Field of Search .................... 219/60.2, 72, 74, 75; 277/34, 34.3; 220/234, 239; 228/57, 219, 220

[56] References Cited

U.S. PATENT DOCUMENTS

| | | | |
|---|---|---|---|
| 1,549,168 | 8/1925 | Townsend | 277/34 |
| 2,843,154 | 7/1958 | Hoskins | 220/239 X |
| 3,994,429 | 11/1976 | Hallenbeck et al. | 219/74 X |
| 4,096,372 | 6/1978 | Hallenbeck | 219/72 |

FOREIGN PATENT DOCUMENTS 651648  11/1962  Canada ..................................... 277/34

Primary Examiner—B. A. Reynolds
Assistant Examiner—Keith E. George
Attorney, Agent, or Firm—Allen D. Gutchess, Jr.

[57] ABSTRACT

An improved purge unit is provided for establishing an enclosed zone around a weld area for retaining an inert gas. The purge unit is particularly advantageous when welding a branch pipe or pipe connection to a main pipe or header. The purge unit has a cone-shaped member which is inserted into an opening in the header through the branch pipe or connection and is then expanded to establish the enclosed zone around the inside of the weld area. An inert gas is then supplied through the purge unit into the zone and the cone-shaped member is subsequently collapsed and withdrawn after the weld is complete. An expandable tube is employed to expand the cone-shaped member and has a rod extending therethrough and connected to the member to provide greater stability for the purge unit.

11 Claims, 5 Drawing Figures

EXPANDABLE PURGE UNIT

This invention relates to a purge unit for establishing an enclosed zone around a weld area to receive and contain an inert gas during welding.

The closest known prior art are U.S. Pat. Nos. 3,994,429 to Hallenbeck et al, and 4,096,372 to Hallenbeck.

When welding stainless steel and most other alloy metals, the weld area must be out of contact with air or any other form of oxygen during the welding. Otherwise, the metal in the weld area oxidizes and produces micro-cracks, resulting in a totally unsatisfactory weld. In many instances, a branch pipe or connection is often to be welded to an existing main pipe or header at a later time after the header is otherwise complete. Heretofore, for welding the branch connection or pipe to the header, the entire header had to be purged, which required a considerable volume of inert gas and also a considerable amount of time to assure that the purge gas had removed all impurities within the header.

The present invention provides an improved purge unit which establishes an enclosed zone inside the header around the weld area. Inert gas is then supplied through the purge unit to the enclosed zone with only a small fraction of the inert gas otherwise required being employed and with the time to assure complete purging also being substantially reduced.

Prior to welding the branch pipe connection, an opening is made in the header at the position where the branch connection is to be located, with the size of the opening being about the size of the internal passage in the branch connection. The connection is then aligned with the opening and the purge unit inserted through the connection and the opening into the header. The purge unit includes an expandable, cone-shaped member which is connected to an elongate member. When the cone-shaped member is inserted into the header, it is expanded and then withdrawn slightly to place the peripheral edge in contact with the inner surface of the header around the opening to establish the enclosed zone.

The expansion of the cone-shaped member is accomplished by an improved inflatable, resilient member or tube which urges outwardly the cone-shaped member when the tube is inflated. The elongate member is sealed with respect to the branch connection and inert gas is supplied through the elongate member into the enclosed zone formed by the expanded cone and the wall of the header. After the weld is complete, the tube is deflated and the cone-shaped member is collapsed by ribs connected to the cone and which lie along the elongate member when in an unstressed condition. The purge unit is then withdrawn through the opening and the branch connection so as to not leave any material in the header which could cause contamination.

Heretofore, the inflatable member was connected to the apex of the cone-shaped member and the resiliency of the inflatable member resulted in some instability of the position of the cone-shaped member at times. With the present purge unit, a rod extends through the inflatable member or tube to the cone to provide stability for it. The rod preferably extends all the way through the elongate member which supplies the gas under pressure to the tube and is movable relative to the elongate member to enable the inflatable member to expand lengthwise as well as transversely when inflated. The rod preferably has a stop at the outside end to limit the extent of the longitudinal movement.

It is, therefore, a principal object of the invention to provide an improved purge unit which enables a weld area to be purged more rapidly and with considerably less inert gas.

Another object of the invention is to provide a purge unit having an inflatable tube for expanding a cone-shaped member.

A further object of the invention is to provide an improved purge unit having an inflatable tube with a rod extending therethrough and connected with a cone-shaped member which is expanded by the inflation of the tube.

Many other objects and advantages of the invention will be apparent from the following detailed description of a preferred embodiment thereof, reference being made to the accompanying drawings, in which.

Figure 1:
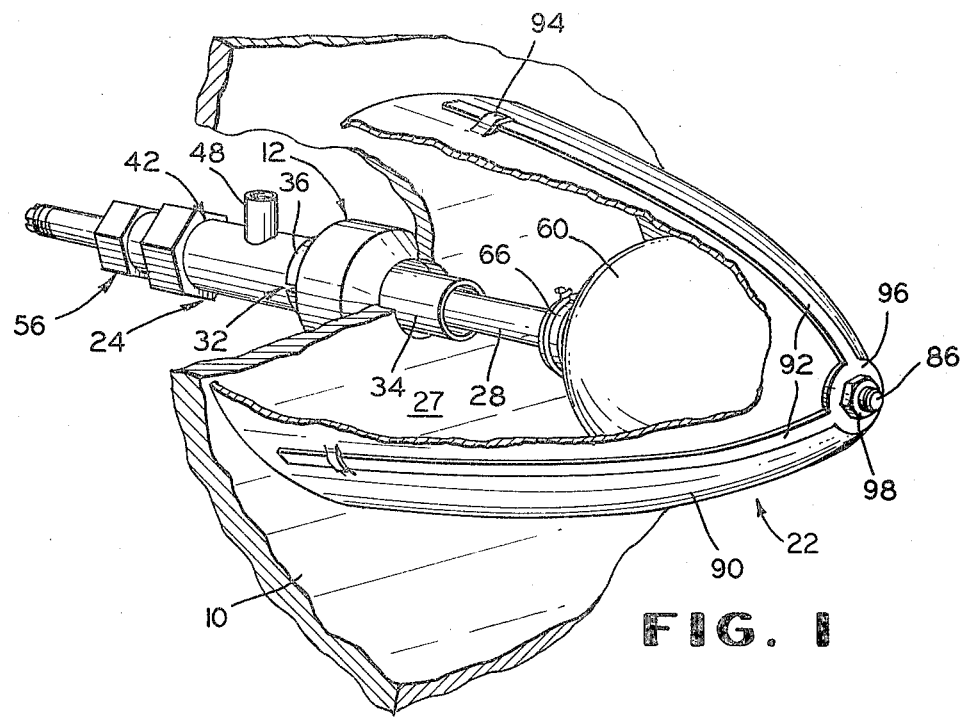
FIG. 1 is a somewhat schematic view in perspective of a purge unit embodying the invention in place within a header or the like, with parts of the purge unit broken away.
Figure 2:
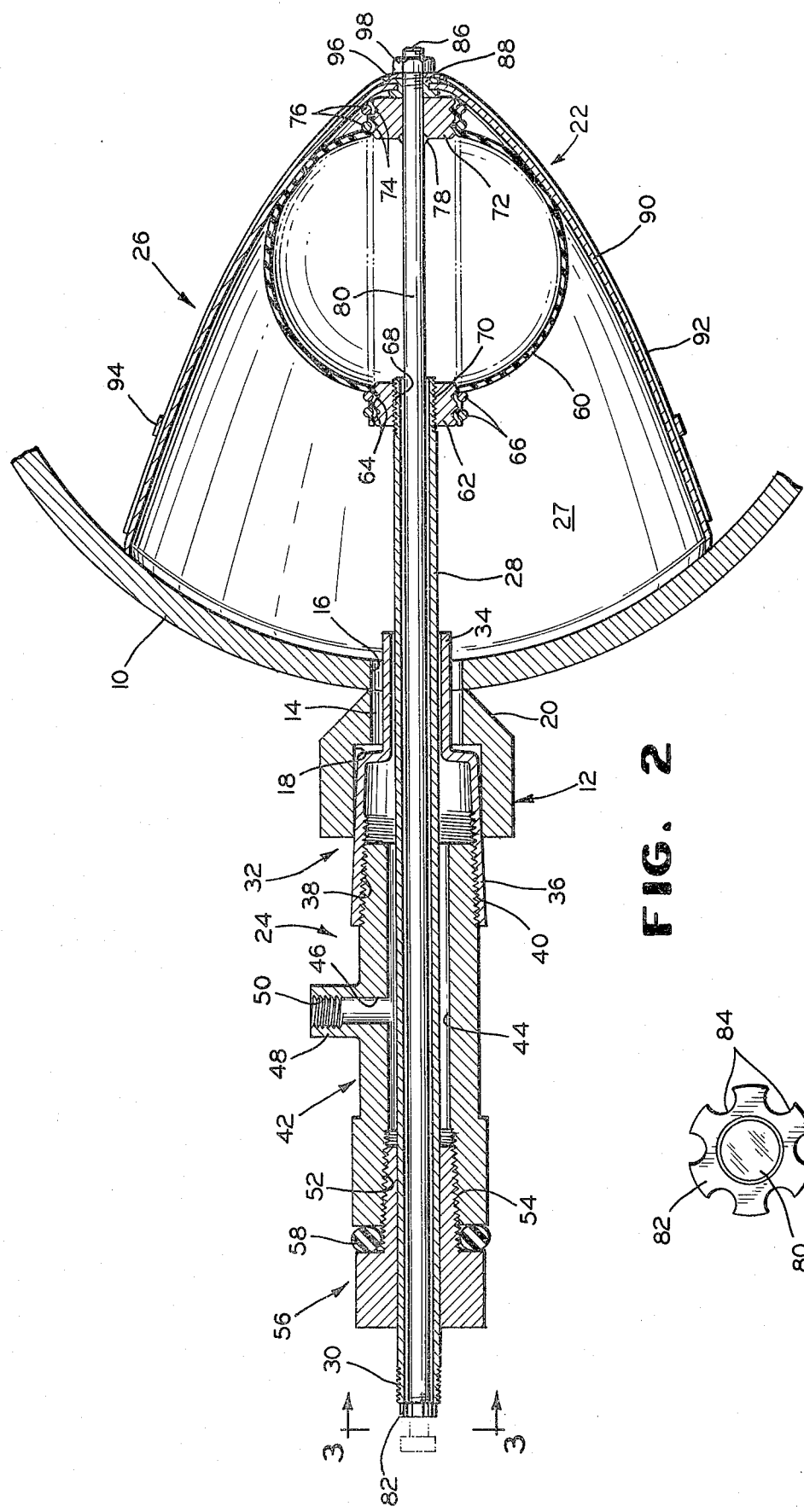
FIG. 2 is a view in longitudinal cross section taken through the purge unit, the header, and a branch connection shown in FIG. 1.

Referring to FIGS. 1 and 2, a main pipe or header 10 has a branch line or connection 12 which is in position to be affixed thereto. The connection in the form shown is specifically a female coupling to receive a branch pipe after the connection is welded to the header. The connection has an inner passage 14, the diameter of which is about equal to the diameter of an opening 16 made in the wall of the header 10. The connection also has a larger outer diameter 18 into which the branch pipe will subsequently be inserted and affixed. The connection 12 further has a beveled end 20 designed to be welded to the header wall in a manner known in the art. The header can be of a widely varying range of sizes with diameters from one-half inch up and with a branch connection similarly having a wide variety of shapes and sizes for branch connections from one-half inch up.

To minimize the amount of inert gas required and the time for purging, an enclosed zone is established within the header 10, which zone has a volume only a small fraction of that of the entire header which otherwise must be purged. The enclosed zone is established by means of a purge unit indicated at 22 which basically includes an elongate member 24 carrying an expandable, cone-shaped member 26.

In using the purge unit 22, the elongate member 24 and the cone-shaped member 26, when in a collapsed condition, are inserted through the connection 12, the passage 14, and the opening 16 into the header 10. The cone-shaped member 26 is then expanded and withdrawn slightly until its outer edge contacts the inner surface of the header to form an enclosed zone 27 around the weld area adjacent to the opening 16. Purge gas is then supplied through the elongate member 24 into the zone 27 and after the connection 12 is welded, the cone-shaped member is collapsed around the elongate member 24 and withdrawn through the now-welded connection.

The elongate member 24 of the purge unit 22 consists of several components. It includes an inner, central supply pipe or tube 28 having an outer threaded end 30 to which a suitable supply line from a source of gas under pressure is connected. This line can have a check valve therein to prevent escape of gas under pressure back through the pipe. The pipe 28 also extends through a fitting 32 which has an end nipple 34 projecting into the header through the passage 14 and also has an outer, flared end 36 which is received in the larger, outer recess 18 of the connection 12. The flared end 36 can be segmented and has internal threads 38 to receive a tapered threaded end 40 of a sleeve 42. When the sleeve 42 is turned into the end 36 of the fitting 32, it expands the end 36 to provide a mechanical engagement with the connection 12. The sleeve 42 can then be held by the welder to hold the connection in place while it is being initially tack welded to the header 10. If desired, the sleeve 42 can be connected by the fitting 32 to the connection 12 prior to the insertion of the member 26 into the header 10. The pipe 28 can then be independently manipulated to seat the cone-shaped member 26.

The sleeve 42 also has a central passage 44 extending longitudinally therethrough with the pipe 28 extending through that passage. A transverse supply passage 46 communicates with an intermediate portion of the passage 44 with the sleeve 42 having a suitable nipple 48 with internal threads 50 to which a supply line from a suitable source of purge or inert gas can be connected. This gas then flows around the pipe 28 and through the passage 44 and the fitting 32 into the enclosed zone 27.

The outer end of the sleeve 42 has an internal thread 52 which receives a threaded end 54 of a collet 56. The end 54 can be split or segmented so as to be urged inwardly when screwed into the threaded end 52 of the sleeve 42 to clamp the collet against the pipe 28 to hold the two stationary relative to one another after the member 26 has been expanded and properly positioned in the header 10. An O-ring 58 forms a seal between the outer end of the sleeve 42 and the collet 56.

In accordance with the invention, an expandable member or tube 60 is located at the inner end of the pipe 28. The tube preferably is of heavy rubber and, when expanded, causes the cone-shaped member 26 to expand outwardly to the position of FIGS. 1 and 2.

A collar 62 at one end of the tube 60 has annular grooves 64 over which one end of the tube extends. Wires 66 are located around the tube end over the grooves 64 to hold the tube securely to the collar, yet enable the tube to be replaced as required. The collar 62 has internal threads 68 which receive a threaded end 70 of the pipe 28. If desired, a cloth shield can extend around part of the tube 60 and be affixed by the wires 66. The loose end of the shield then extends outwardly when the tube is expanded to help shield the tube from the heat at the weld area. A second collar 72 is located at the other end of the tube 60 and has annular grooves 74 over which the other end of the tube extends. Wires 76 are wound on the tube end over the grooves 74 to securely connect the tube to the collar 72 but again enable it to be replaced.

Figure 3:
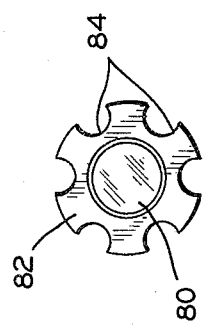
FIG. 3 is an enlarged end view taken along the line 3—3 of FIG. 2.

In this instance, the collar 72 is affixed, as by weld metal 78, to an elongate supporting member or rod 80. The rod 80 is supported by the pipe 28 and preferably extends all the way through it beyond the threaded end 30. At that end, the rod 80 has a stop 82 suitably affixed thereto as by being threaded or welded. The stop 82 is smaller than the threaded end 30 so that the supply line can be fastened to the end 30 to supply gas under pressure to the tube 60. When the tube 60 is deflated, as in FIG. 4, the stop 82 is spaced from the end of the pipe 28. However, when the tube 60 is inflated, the tube can extend longitudinally somewhat as well as transversely to enable more effective expansion of it. The stop 82 then moves against the end of the pipe 28, as shown in solid lines in FIG. 2. The stop 82 has notches 84 (FIG. 3) to enable the gas to be supplied to the pipe 28 even when the stop 82 is against the threaded end 30. Also, the rod 80 is of a smaller diameter than the inner diameter of the pipe 28 to enable the gas to flow through the pipe 28 to the tube 60.

At the inner end, the rod 80 is threaded at 86 and extends through a grommet 88 which is affixed in a known manner to an intermediate portion of a wall 90 of the cone-shaped member 26. The wall 90 can be made of a suitable woven material or fabric, preferably one which is capable of withstanding temperatures in the order of 300° F. to which the wall 90 may be subjected during welding.

With this arrangement, the wall 90 of the member 26 is substantially rigidly supported through the rod 80 so as to be stable and more accurately positioned relative to the header 10 and the weld area. The cone-shaped member 26 also remains connected even if the tube 60 fails.

The cone-shaped member 26 also has a plurality of resilient flat springs 92 extending along the wall 90 and affixed thereto by loops or straps 94. The springs 92 preferably stop short of the peripheral edge of the cone-shaped wall 90 to assure that the wall 90 will contact the inner surface of the header after the wall is expanded and retracted slightly by the pipe 28 before the collet 56 is secured thereagainst. Particularly for smaller diameter headers, it may be desirable to specially shape the peripheral edge of the cone-shaped member to conform more fully to the inner surface of the header wall. However, it is not essential that a completely gas-tight engagement or contact be achieved between the member 26 and the header wall since slight leakage will not affect the weld, although slightly more gas would be used.

Figure 4:
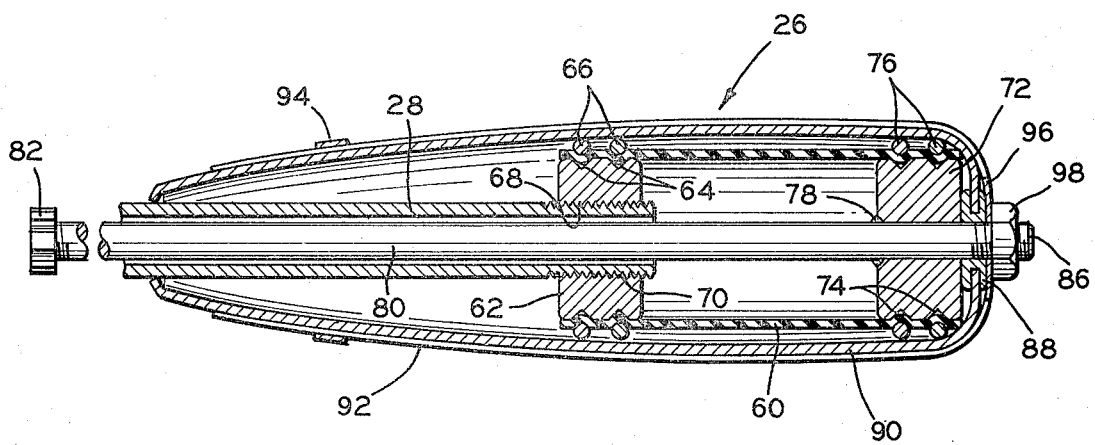
FIG. 4 is an enlarged view in longitudinal cross section taken through the cone-shaped member and an inflatable member of the purge unit when in a collapsed condition.

The springs 92 are structurally integral with a mounting ring 96, the springs 92, four being preferred, and the ring 96 being stamped out of a single sheet of metal. After being stamped, the springs 92 are bent relative to the ring 96 so as to be in an unstressed position, as shown in FIG. 4, when the tube 60 is deflated. Hence, when the tube 60 is deflated, the springs 92 automatically return to the unstressed position adjacent the elongate member and accordingly move the wall 90 of the cone-shaped member 26 back along the elongate member so that the unit can be retracted from the header.

A nut 98 is turned onto the threaded end 86 of the rod 80 to securely hold the spring ring 96 against the grommet 88 which, in turn, is squeezed against the adjacent surface of the collar 72. This enables relatively easy replacement of the wall 90.

Figure 5:
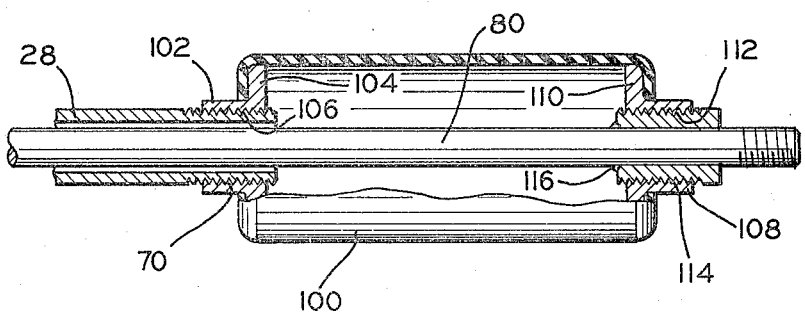
FIG. 5 is a view similar to FIG. 4 of a slightly modified embodiment of the invention.

A slightly modified inflatable member or tube 100 is shown in FIG. 5. A collar 102 at one end of the tube has a flange 104 suitably affixed to the tube. The collar 102 has internal threads 106 which receive the threaded end 70 of the pipe 28. A second collar 108 is located at the other end of the tube 100 and has a flange 110 affixed to that end of the tube. The collar 108 has internal threads 112 which are threaded on a threaded member or pipe nipple 114 affixed to the rod 80 by weld metal 116. When the tube 100 is to be replaced, it is replaced along with the collars 102 and 108 as a complete molded assembly.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A purge unit for establishing an enclosed zone around a weld area, said purge unit comprising an elongate member having a gas supply pipe extending longitudinally thereof, means connected to an end of said gas supply pipe and forming an expandable chamber, a flexible, expandable member having an edge portion adapted to engage the surface of a workpiece around the weld area to establish the enclosed zone, elongate supporting means supported in said gas supply pipe, extending through said expandable chamber means, and affixed to said expandable member, said expandable chamber means urging said expandable member outwardly, when inflated, to form the enclosed zone with said expandable chamber means being within said enclosed zone.

2. A purge unit according to claim 1 characterized by said elongate member having additional passage means to supply purge gas to the enclosed zone when said expandable member is expanded.

3. A purge unit according to claim 1 characterized by there being a plurality of longitudinal, flat springs connected with said expandable member and urging said expandable member toward a collapsed position, said flat springs being structurally integral with a ring which is affixed to said supporting means.

4. A purge unit according to claim 1 wherein said expandable chamber means is a tube.

5. A purge unit according to claim 4 characterized by said tube having one end affixed to one collar which is affixed to the end of said gas supply tube and having another end affixed to a second collar which is affixed to said supporting means.

6. A purge unit according to claim 1 wherein said supporting means is a rod extending into said gas supply pipe.

7. A purge unit according to claim 6 characterized by said rod extending completely through said gas supply pipe and having stop means beyond the opposite end thereof, whereby said rod can move to a limited extent longitudinally when said expandable chamber means is expanded.

8. A purge unit for establishing an enclosed zone around an opening in a main pipe to which a connection is to be welded, said purge unit comprising an elongate member having a gas supply pipe extending longitudinally thereof, means forming an expandable chamber connected to an end of said gas supply pipe, expandable wall means having an intermediate portion and edge portions, said edge portions being adapted to engage the inner surface of said main pipe around the opening when expanded by said expandable chamber means, and elongate supporting means supported by said gas supply pipe, extending through said expandable chamber means, and affixed to said intermediate portion of said expandable wall means, said elongate supporting means being longitudinally movable with respect to said gas supply pipe, extending completely through said gas supply pipe, and having stop means beyond the opposite end thereof, whereby said elongate supporting means can move to a limited extent longitudinally when said expandable chamber means is expanded.

9. A purge unit according to claim 8 characterized by said elongate member having additional passage means to supply purge gas to the enclosed zone of said wall means.

10. A purge unit according to claim 8 wherein said supporting means is a rod extending into said gas supply pipe.

11. A purge unit according to claim 8 characterized by there being a plurality of longitudinal, flat springs connected with said wall means and urging said wall means toward a collapsed position, said flat springs being structurally integral with a ring which is affixed to said supporting means.

* * * * *